United States Patent [19]

Stahlecker

[11] Patent Number: 5,030,019
[45] Date of Patent: Jul. 9, 1991

[54] BEARING FOR AN OPEN-END SPINNING ROTOR

[75] Inventor: Fritz Stahlecker, Bad Überkingen, Fed. Rep. of Germany

[73] Assignee: Hans Stahlecker, Fed. Rep. of Germany; a part interest

[21] Appl. No.: 578,800

[22] Filed: Sep. 7, 1990

[30] Foreign Application Priority Data

Sep. 12, 1989 [DE] Fed. Rep. of Germany ....... 3930365

[51] Int. Cl.$^5$ .............................................. F16C 19/00
[52] U.S. Cl. .................................... 384/610; 384/603
[58] Field of Search ............... 384/610, 245, 615, 603, 384/609, 246

[56] References Cited

U.S. PATENT DOCUMENTS 2,316,920  4/1943  Weber .................................. 384/245
4,106,192  8/1978  Stahlecker ........................... 384/610
4,805,432  2/1989  Paulhac ............................... 384/610

FOREIGN PATENT DOCUMENTS 2514734  10/1982  Fed. Rep. of Germany .

Primary Examiner—Lenard A. Footland
Attorney, Agent, or Firm—Evenson, Wands, Edwards, Lenahan & McKeown

[57] ABSTRACT

In the case of a bearing for an open-end spinning rotor, the shaft of which is radially disposed by means of supporting disks and axially, with its end, is supported at a ball, it is provided that the ball is suppported by means of an abutment which has finger-type parts which are constructed such that they have natural frequencies which slightly differ from one another and permit a beat.

18 Claims, 2 Drawing Sheets

BEARING FOR AN OPEN-END SPINNING ROTOR

BACKGROUND AND SUMMARY OF THE INVENTION

The invention relates to a bearing for an open-end spinning rotor, the shaft of which is radially held by means of supporting disks and with its end is axially supported at a ball which in turn is supported on the opposite side by means of a pin-shaped abutment arranged as an extension of the shaft. This abutment has a ball-socket-shaped guiding surface for the ball and a clamping point at a distance from it. The abutment is divided into finger-shaped parts by means of at least one longitudinal slot starting from the guiding surface.

In the case of a bearing of the initially mentioned type disclosed in German Patent Document DE-C 25 14 734, it is known to indicate preferred vibrating directions by means of a special shaping and to determine the natural frequencies of the finger-type parts. In this case, it is also known to place the slot such that the finger-type parts have different natural vibrations so that they are excited by different machine vibrations. It is also known to arrange the slot in the center so that the two finger-type parts are excited to perform vibrations when the frequencies are the same.

It is an object of the invention to develop a bearing of the initially mentioned type such that, at rotational speeds of the open-end spinning rotor of more than 100,000 min$^{-1}$, a sufficient service life particularly of the axial bearing is obtained.

This object is achieved in that the finger-type parts are designed such that they have natural frequencies which slightly differ from one another and permit a beat.

By means of this construction, it is achieved that the finger-type parts vibrate not only at one excitation frequency, but also at excitations in a larger frequency range. It is sufficient for one of the finger-type parts to be excited to perform a vibration so that, by means of a beat, it will then also excite the other finger-type part.

In a further development of the invention, it is provided that the natural frequency of the one finger-type part differs by less than 10 percent from the natural frequency of the other finger-type part. As a result, a sufficiently larger frequency range is achieved for the exciting vibration.

In a further development of the invention, it is provided that the finger-type parts have a natural frequency of between 4,000 Hz and 5,000 Hz, and preferably of approximately 4,400 Hz. It was found that these natural frequencies are to be preferred for the currently customary dimensions of open-end spinning rotors.

In an advantageous embodiment of the invention, it is provided that the pin-shaped part of the abutment has a diameter of approximately 8 mm, a slot of a length of approximately 20 mm and of a width of approximately 4 mm and is assigned to a ball with a diameter of approximately 12 mm.

Other objects, advantages and novel features of the present invention will become apparent from the following detailed description of the invention when considered in conjunction with the accompanying drawings.

DETAILED DESCRIPTION OF THE DRAWINGS

Figure 1:
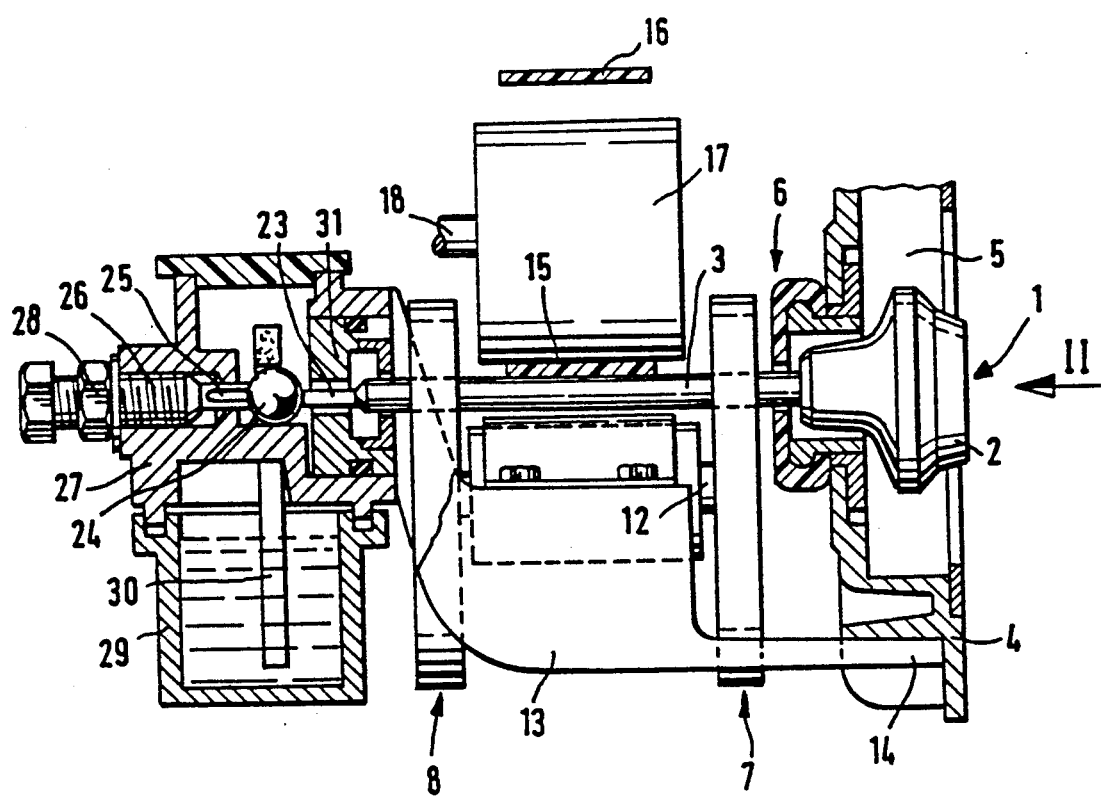
FIG. 1 is a schematic partially sectional lateral view of a bearing for an open-end spinning rotor, constructed according to a preferred embodiment of the invention.

FIG. 1 shows an open-end spinning rotor assembly 1 which comprises a rotor 2 and a shaft 3. The rotor 2 rotates in a vacuum chamber 5 formed by a rotor housing 4 which is connected to a vacuum source in a manner which is not shown. The shaft 3 penetrates the rear wall of the rotor housing 4 which is sealed off by means of a ram sealing device 6.

Figure 2:
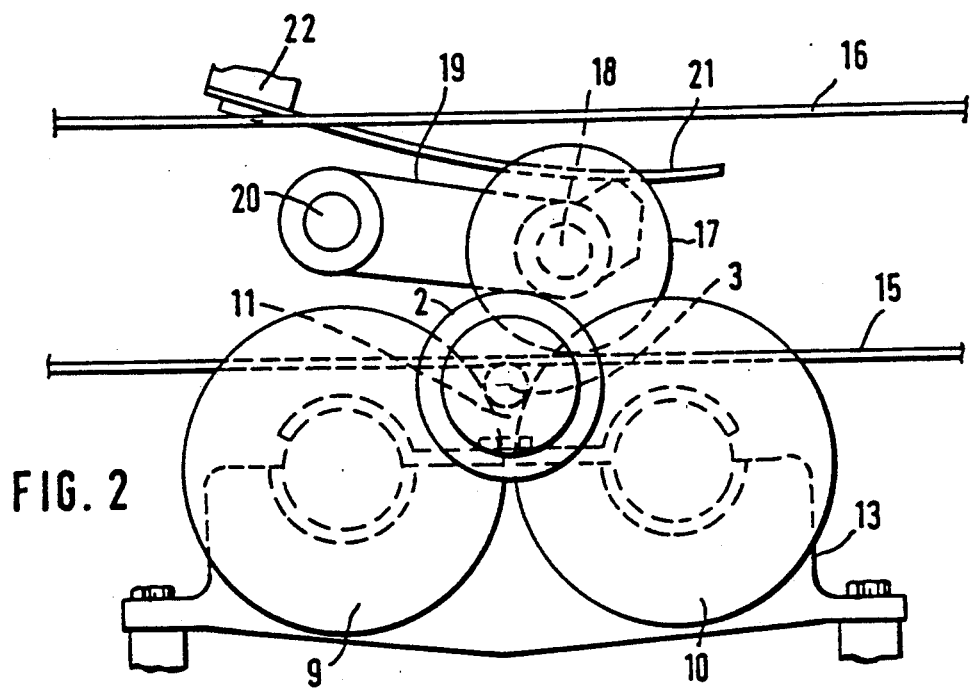
FIG. 2 is a view in the direction of the arrow II of FIG. 1 with several components are left out to aid in illustrating the invention.

The shaft 3 is radially disposed in wedge-shaped gaps 11 formed by pairs 7, 8 of supporting disk pairs (see Also FIG. 2). The supporting disks 9, 10 of each of the supporting disk pairs 7, 8 are arranged on shafts 12 which are disposed in bearings which are held by a bearing holder 13. The bearing holder 13 is provided with a projection 14 which carries the rotor housing 4.

Shaft 3 is driven by means of a tangential belt, the lower run 15 of this belt running against the shaft 3, and the upper run 16 of the belt running back above the shaft 3. The lower run 15 of the tangential belt, in the proximity of the shaft 3 is loaded by means of a pressure roller 17 which is arranged, pivotally around an axis 18, on a lever arm 19 which can be swivelled around an axis 20. The lever arm 19 is loaded in the direction of the lower end 15 of the belt by a leaf spring 21 which is fastened to a stationary machine part 22.

The shafts 12 of the supporting disks 9, 10 of the two pairs 7, 8 of supporting disks, in a known manner, are arranged skewed with respect to one another in such a manner that an axial shearing force is generated in the direction away from the rotor 2. By means of this axial force, the end 23 of the shaft 3 with the reduced diameter supports itself against a ball 24 serving as the axial bearing. The ball 24, in turn, is supported against an abutment 25 which has a pin-shaped design and is arranged as an extension of shaft 3. The abutment 25 has a threaded part 26 by means of which it is screwed into a threaded bore of a step bearing housing 27. The abutment 25, which is therefore axially adjustable, is secured in the adjusted position by means of a counternut 28.

The step bearing housing 27, which is mounted on a projection of the bearing holder 13, comprises a part 29 which is filled with a lubricant into which a wick 30 is dipped which rests on the ball 24 and conveys the lubricant into its area. In the area of the end 23 of the shaft 3, the step bearing housing 27 is provided with a sealing device 31.

Figure 3:
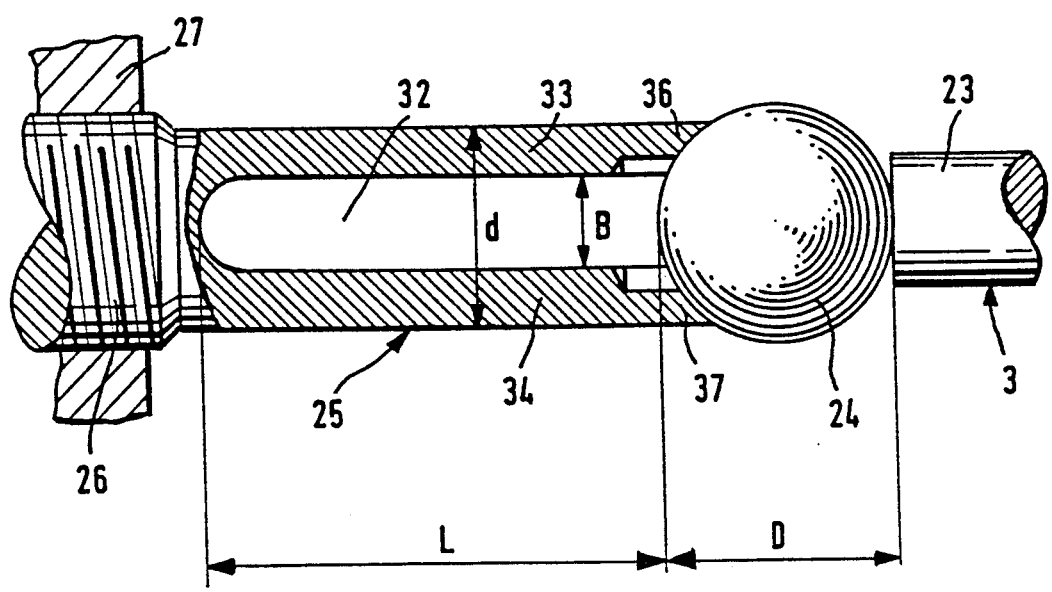
FIG. 3 is a very enlarged portion of the bearing according to FIG. 1.

As shown in FIG. 3, the abutment 25, between the ball 24 and the threaded part 26 by means of which it is screwed into the step bearing housing 27, has a pin-type section which has a cylindrical outer contour. By means of a longitudinal slot 31, this pin-type section is divided into two finger-type parts 33, 34 which form ball-socket-type guiding surfaces 36, 37 at their free ends for the ball 24.

The longitudinal slot 32 is arranged slightly outside the axial center so that the two finger-type parts 33, 34 have natural frequencies which differ slightly from one another. In this case, it is endeavored to have the natural frequency at approximately 4,400 Hz; i.e., that, for example, the finger-type part 33 has a natural frequency of, for example, 4,300 Hz, and the finger-type part 34 has a natural frequency of, for example, 4,500 Hz.

In a practical embodiment, it is provided that the ball 24 has a diameter (D) of approximately 11.5 mm to 12.5 mm and that then the pin-shaped section of the abutment 25 will be assigned a diameter (d) of approximately 8 mm. The slot 32 will then have a width (B) of approximately 3.9 mm and a length (L) of approximately 19 mm. In this case, the slot 32 extends to close to the threaded part 26. An axial shear is generated by the crossing of the shafts 12 of the pairs 7, 8 of supporting disks which, in the case of the intended rotational rotor speeds of 110,000 min$^{-1}$ and higher, amounts to approximately 7N to 12N.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A bearing for an open-end spinning rotor, the shaft of which rotor is radially held by means of supporting disks and with its end is axially supported at a ball which is supported in turn on the opposite side by means of a pin-shaped abutment arranged as an extension of the shaft, said bearing comprising said abutment having a ball-socket guiding surface for the ball and, at a distance from it, a clamping point and being divided into finger-shaped parts by means of at least one longitudinal slot starting from the guiding surface, wherein the finger-type parts are constructed such that they have natural frequencies which slightly differ from one another and permit a beat.

2. A bearing according to claim 1, wherein the natural frequency of the one finger-type part differs from the natural frequency of the other finger-type part by less than 10 percent.

3. A bearing according to claim 1, wherein the pin-shaped part of the abutment has a diameter of approximately 8 mm, a slot of a length of approximately 20 mm and a width of approximately 4 mm and is assigned to a ball with a diameter of approximately 12 mm.

4. A bearing according to claim 1, wherein the finger-type parts are constructed to be approximately mirror-symmetrical with respect to one another.

5. A bearing according to claim 1, wherein the pin-shaped part of the abutment has a round cross-section with an outside diameter which corresponds to approximately 0.6 times to 0.8 times times the diameter of the ball.

6. A bearing according to claim 1, wherein the length of the slot corresponds to approximately twice the diameter of the ball.

7. A bearing according to claim 1, wherein the width of the slot corresponds to approximately 1.5 times its length.

8. A bearing according to claim 1, wherein the shaft loads the ball (24) with an axial force in the order of magnitude of 7N to 12N.

9. A bearing according to claim 1, wherein the shaft is driven at rotational speeds of more than 110,000 min$^{-1}$.

10. A bearing according to claim 1, wherein the finger-type parts have a natural frequency of between 4,000 Hz and 5,000 Hz.

11. A bearing according to claim 2, wherein the finger-type parts have a natural frequency of between 4,000 Hz and 5,000 Hz.

12. A bearing according to claim 11, wherein one of said finger-type parts has a natural frequency of 4300 HZ and the other has a natural frequency of 4500 HZ.

13. A bearing according to claim 11, wherein the pin-shaped part of the abutment has a round cross-section with an outside diameter which corresponds to approximately 0.6 times to 0.8 times times the diameter of the ball.

14. A bearing according to claim 13, wherein the length of the slot corresponds to approximately twice the diameter of the ball.

15. A bearing according to claim 14, wherein the width of the slot corresponds to approximately 1.5 of its length.

16. A bearing according to claim 15, wherein the shaft loads the ball with an axial force in the order of magnitude of 7N to 12N.

17. A bearing according to claim 16, wherein the pin-shaped part of the abutment has a diameter of approximately 8 mm, a slot of a length of approximately 20 mm and a width of approximately 4 mm and is assigned to a ball with a diameter of approximately 12 mm.

18. A bearing according to claim 13, wherein the pin-shaped part of the abutment has a round cross-section with an outside diameter which corresponds to approximately 0.7 times the diameter of the ball.

* * * * *